(12) United States Patent
Kokeguchi et al.

(10) Patent No.: US 6,237,937 B1
(45) Date of Patent: May 29, 2001

(54) PROTECTIVE BAG FOR VEHICLE OCCUPANT'S HEAD

(75) Inventors: Akira Kokeguchi; Ryosuke Nakanishi; Yasushi Masuda, all of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/336,970

(22) Filed: Jun. 21, 1999

(30) Foreign Application Priority Data

Jun. 23, 1998 (JP) ................................. 10-175986

(51) Int. Cl.$^7$ ................................. B60R 21/22
(52) U.S. Cl. ................................. 280/730.2; 280/743.1
(58) Field of Search ................................. 280/730.1, 730.2, 280/743.1, 743.2

(56) References Cited

U.S. PATENT DOCUMENTS

| | | | |
|---|---|---|---|
| 5,865,462 | * | 2/1999 | Robins et al. ............ 280/730.2 |
| 6,042,141 | * | 3/2000 | Welch et al. ............ 280/730.2 |
| 6,056,316 | * | 5/2000 | Yamaji et al. ............ 280/730.2 |
| 6,170,860 | * | 1/2001 | Denz et al. ............ 280/730.2 |

FOREIGN PATENT DOCUMENTS

| | | |
|---|---|---|
| 296 05 896 | 7/1996 | (DE) . |
| 297 09 389 | 9/1997 | (DE) . |
| 0 841 211 | 5/1998 | (EP) . |
| 0 900 704 | 3/1999 | (EP) . |

* cited by examiner

Primary Examiner—Paul N. Dickson
(74) Attorney, Agent, or Firm—Kanesaka & Takeuchi

(57) ABSTRACT

A bag 1 is formed of an occupant-side sheet 2 and a vehicle body-side sheet 3. These sheets 2, 3 are superposed on each other and joined together along their peripheries so as to form an introduction chamber 7 and a main chamber 8 between the sheets 2 and 3. A lateral connecting line 10 is connected to the front side of the main chamber 8 and extends rearwardly from the end of the aforementioned edge in the substantially horizontal direction. The rear end of the connecting line 10 is spaced apart from the rear edge of the main chamber 8. A vertical connecting line 22 extends downwardly from the rear end of the lateral connecting line 10 and the vertical connecting line 21 extend downwardly from a portion of the lateral connecting line 10. The lower ends of the vertical connecting lines 21, 22 are spaced apart from the lower edge of the main chamber 8. Cells 8b, 8c, 8d communicate with each other through portions beneath the vertical connecting lines 21, 22.

9 Claims, 7 Drawing Sheets

PROTECTIVE BAG FOR VEHICLE OCCUPANT'S HEAD

BACKGROUND OF THE INVENTION AND RELATED ART STATEMENT

The present invention relates to a protective bag for a vehicle occupant's head and, more particularly, to a bag which can be inflated along a window of a side door in the event of a lateral impact or roll-over situation. In detail, it relates to a protective bag for a vehicle occupant's head comprising two sheets which are superposed on each other and joined together along their peripheries to form a vacancy extending in a longitudinal direction of a vehicle, wherein the two sheets are connected to each other by a connecting line within the vacancy.

A protective bag for a vehicle occupant's head is disclosed in WO96/26087, particularly, FIG. 1 and FIG. 9 thereof. The bag has a vacancy comprising a duct extending from a front end to a rear end thereof and a plurality of cells communicated with the duct and extending downwardly. Between the adjacent cells, an occupant-side sheet and a vehicle body-side sheet are joined.

According to the bag disclosed in WO96/26087, gas flows into the duct through a rear end thereof so that the cells are inflated in order from the rearmost one in a longitudinal direction of the vehicle. Therefore, the frontmost cell is inflated with significant time lag behind the rearmost cell.

OBJECT AND SUMMARY OF THE INVENTION

It is an object of the present invention to provide a protective bag for a vehicle occupant's head, in which time lag among the respective parts of the bag is small so that the bag can be quickly inflated as a whole.

A protective bag for a vehicle occupant's head is arranged about a corner between a ceiling and a side of a vehicle cabin and is designed to be inflated with introduced gas downwardly along the side. The bag comprises an occupant-side sheet and a vehicle body-side sheet which are superposed on each other and connected together along their peripheries to form a vacancy, to be filled by the gas, between the sheets. The vacancy is elongated in the longitudinal direction of the vehicle and the sheets are partly connected to each other within the vacancy by a connecting line. The vacancy has a gas inlet at an end in the longitudinal direction thereof. The vacancy comprises an introduction chamber for gas and a main chamber communicating with the introduction chamber. The introduction chamber is joined to an upper portion of a front or rear end of the main chamber. The connecting line extends in the longitudinal direction of the vehicle from substantially the middle of the side of the main chamber.

In one aspect, the introduction chamber is joined to the upper portion of the front side of the main chamber and the connecting line extends backwards from the front side of the main chamber.

In another aspect, the introduction chamber is joined to the upper portion of the rear side of the main chamber and the connecting line extends forwards from the rear side of the main chamber.

According to the protective bag for a vehicle occupant's head of the present invention, gas introduced from the introduction chamber into the main chamber flows along the connecting line and turns around or along the end of the connecting line to flow below the connecting line. After the gas flows in an upper portion of the main chamber and inflates the entire upper portion of the main chamber, the gas sufficiently inflates the respective cells under the connecting line, thereby inflating each cell with little delay from another.

BRIEF DESCRIPTION OF THE DRAWINGS

FIG. 1a is a front view of a protective bag for a vehicle occupant's head according to a first embodiment, FIG. 1b is a sectional view taken along a line 1b—1b of FIG. 1a, FIG. 1c is a sectional view taken along a line 1c—1c of FIG. 1a;

DETAILED DESCRIPTION OF PREFERRED EMBODIMENTS

Figure 1:
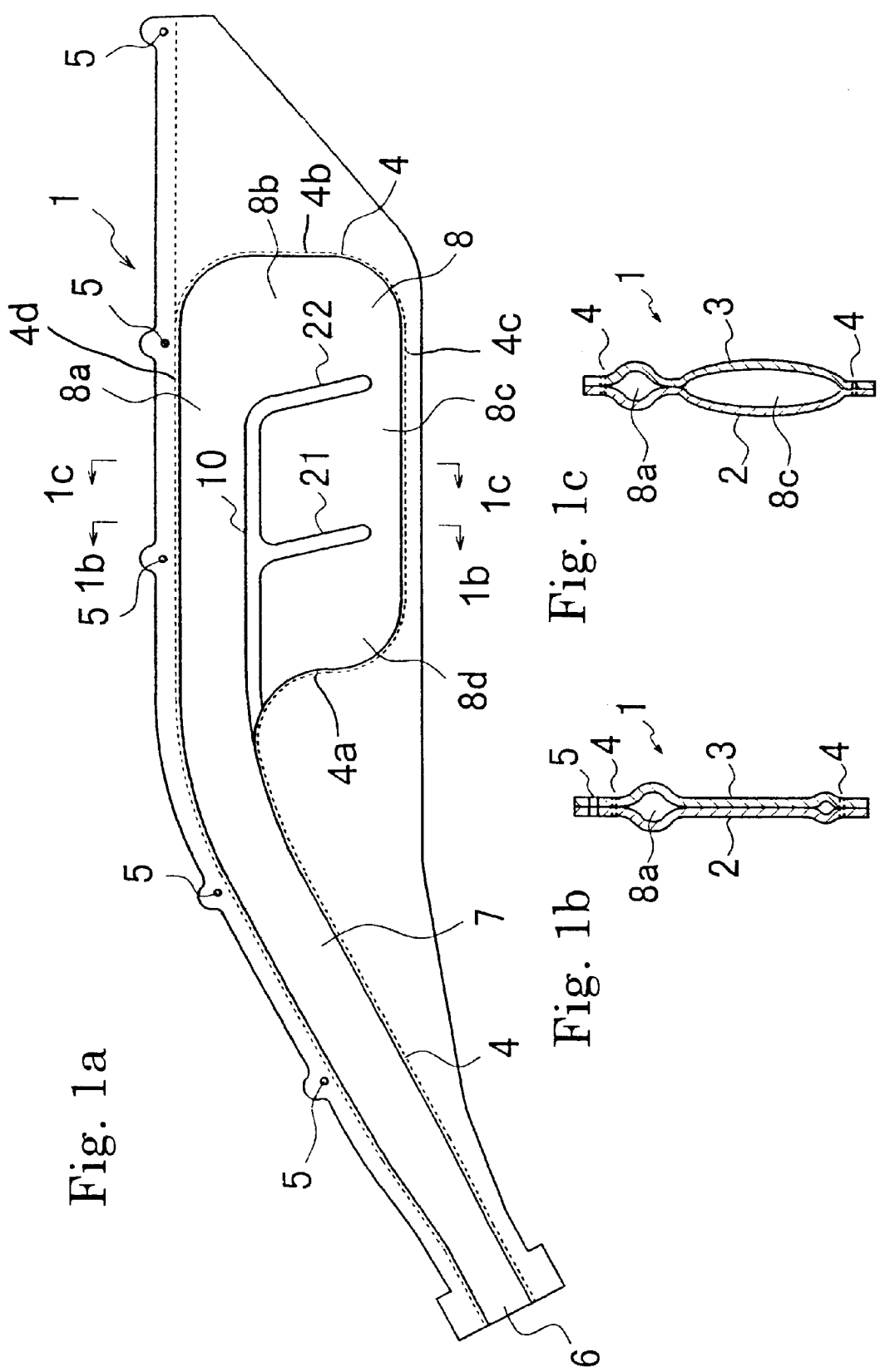

Hereinafter, preferred embodiments of the present invention will be described with reference to the attached drawings.

FIG. 1a is a front view showing a protective bag for a vehicle occupant's head according to a first embodiment, FIG. 1b and FIG. 1c are sectional views taken along lines 1b—1b and 1c—1c of FIG. 1a, respectively.

The bag 1 comprises an occupant-side sheet 2 and a window-side sheet, that is a vehicle body-side sheet, 3 which are superposed on each other and joined together along their peripheries so as to form a vacancy, or space forming an introduction chamber 7 or path and a main chamber 8, between the sheets 2 and 3. The sheets 2,3 are joined along the peripheries by seams having stitches 4. But the sheets may be joined by another means including adhesives, fusion bond, i.e. welding, or the like. In order to mount the bag 1 to a roof side member and an A pillar (not shown) of a vehicle, the bag 1 is provided with projections on the upper side thereof and through-holes 5 formed in the respective projections for inserting fixtures such as rivets therethrough.

The introduction chamber 7 extends along the A pillar and has a gas inlet 6 formed in the front end. The rear end of the introduction chamber 7 communicates with an upper portion of the front side 4a of the main chamber 8. The sheets 2,3 have extensions extending downward from the chamber 7. Bottoms of the extensions are located at the same level as a bottom of the chamber 8 or lower than it. Either of the sheets 2,3 may have the extension.

Within the main chamber 8, the sheets 2, 3 are joined to each other by a lateral connecting line 10 and a vertical connecting lines 21, 22. These lines may be formed by sewing, adhesion, fusion bond or the like.

The connecting line 10 is elongated from the lower edge of the introduction chamber 7 on the front side of the main chamber 8 and extends rearwardly therefrom in the substantially horizontal direction. The rear end of the connecting line 10 is spaced apart from the rear side 4b of the main chamber 8.

The vertical connecting line 22 extends downward from the rear end of the lateral line 10 and the vertical line 21 extends downward from a middle portion of the lateral line 10. The lower ends of the vertical lines 21, 22 are spaced apart from the lower side 4c of the main chamber 8. The main chamber 8 is divided into four cells 8a, 8b, 8c and 8d. The cells 8b, 8c and 8d communicate with each other through portions beneath the vertical lines 21, 22.

The bag 1 is installed in such a state that the front portion including the introduction chamber 7 is folded along the A pillar of the vehicle and the rear portion including the main chamber 8 is folded along a roof side rail (not shown) of the vehicle.

The folded bag 1 is enclosed by a cover, which is designed to be torn when the bag 1 is inflated.

As the vehicle comes in lateral collision or roll-over, an inflator (not shown) is actuated so that gas flows into the introduction chamber 7 through the gas inlet 6. The gas enters into the main chamber 8 through the introduction chamber 7. The gas flows rearwardly (to the right in FIG. 1a) in the cell or upper cell 8a positioned above the lateral connecting line 10 and extending in the longitudinal direction of the vehicle, and enters into the cell or rear cell 8b at the rear side of the vertical connecting line 22 and then into the cells or lower cells 8c, 8d through the portion beneath the vertical lines 22, 21.

Since the cells 8a, 8b are first inflated with gas from the introduction chamber 7, the upper portion of the bag 1 can be inflated almost simultaneously in the longitudinal direction with no or very little time delay. After that, the cells 8c, 8d are inflated. When the upper portion of the bag 1 is inflated at substantially the same time from the front side to the rear side, the cover enclosing the bag 1 is torn along the longitudinal direction of the vehicle so that the cells 8c, 8d can be quickly inflated along at least one of the window and the door of the vehicle.

Figure 2:
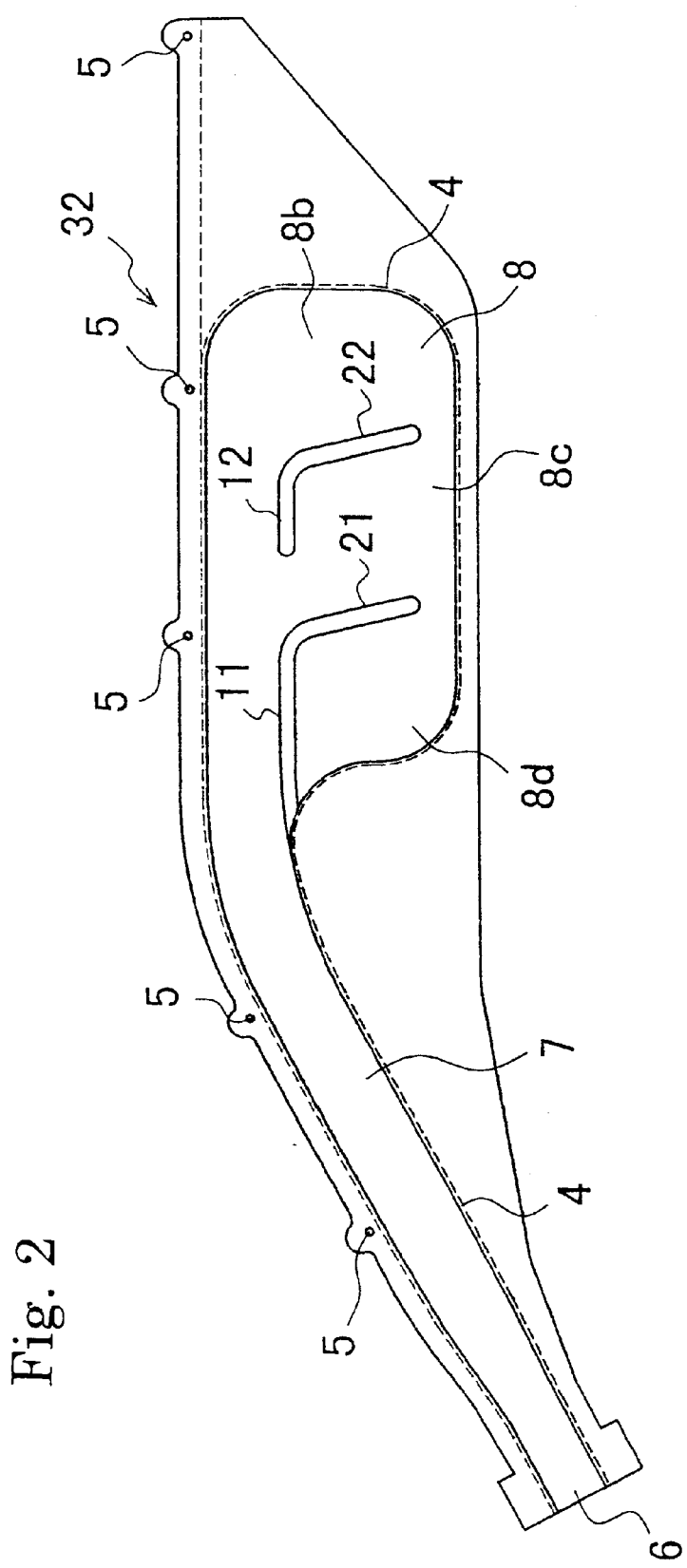
FIG. 2 is a structural view of a protective bag for a vehicle occupant's head according to a second embodiment.
Figure 3:
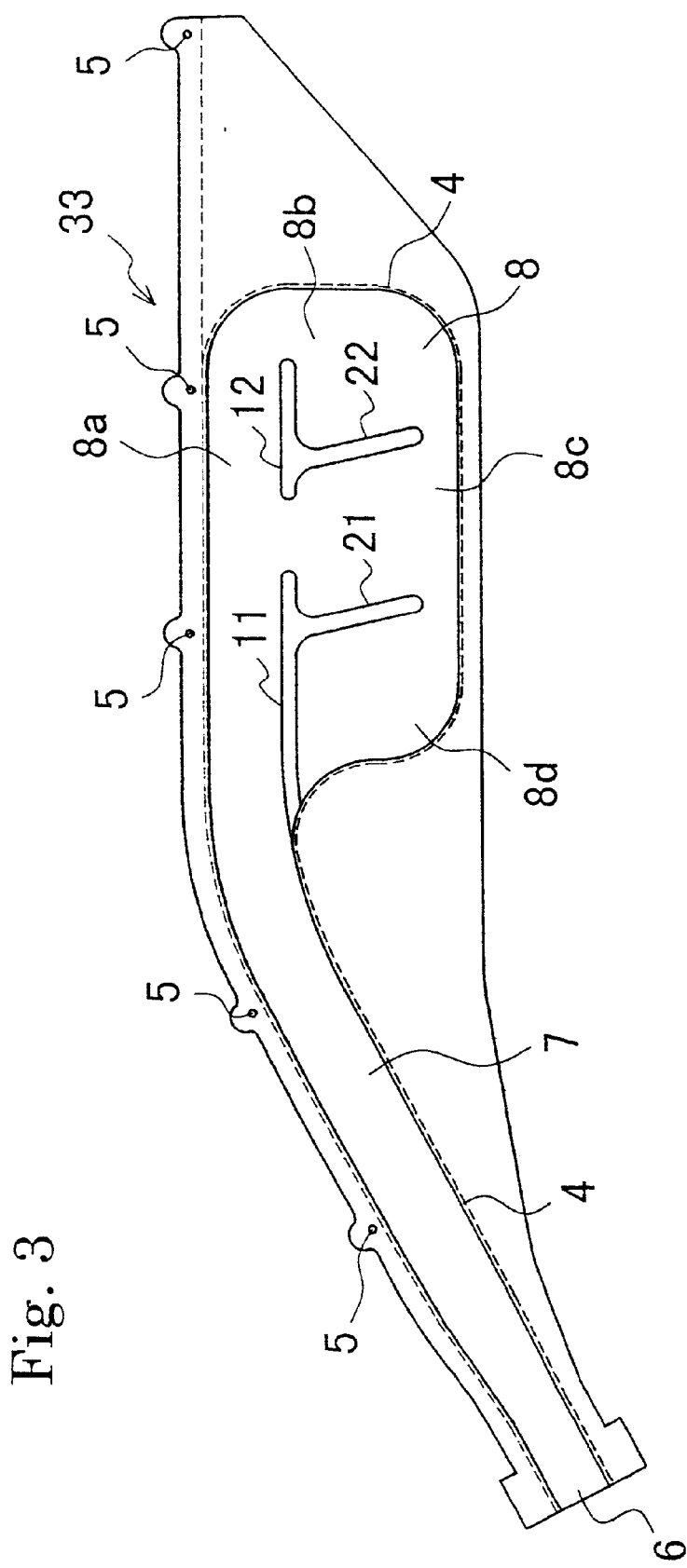
FIG. 3 is a structural view of a protective bag for a vehicle occupant's head according to a third embodiment.

FIGS. 2 and 3 are front views of bags 32, 33 according to second and third embodiments, respectively. In these embodiments, two connecting lines 11, 12 are provided to be spaced apart from each other as the lateral connecting lines. The line 12 is positioned in the extended line of the line 11.

In FIG. 2, vertical lines 21, 22 extend from the rear ends of the lateral lines 11, 12 in such a manner that the joined lines 11 and 21, the lines 12 and 22 form together L-shaped configurations, respectively. In FIG. 3, vertical lines 21, 22 extend downwardly from portions of the lateral lines 11, 12 in such a manner that the joined lines 11 and 21, lines 12 and 22 form together T-shaped configurations, respectively.

The bags 32, 33 shown in FIGS. 2, 3 can also be rapidly inflated as well as the bag 1 shown in FIG. 1.

Figure 4:
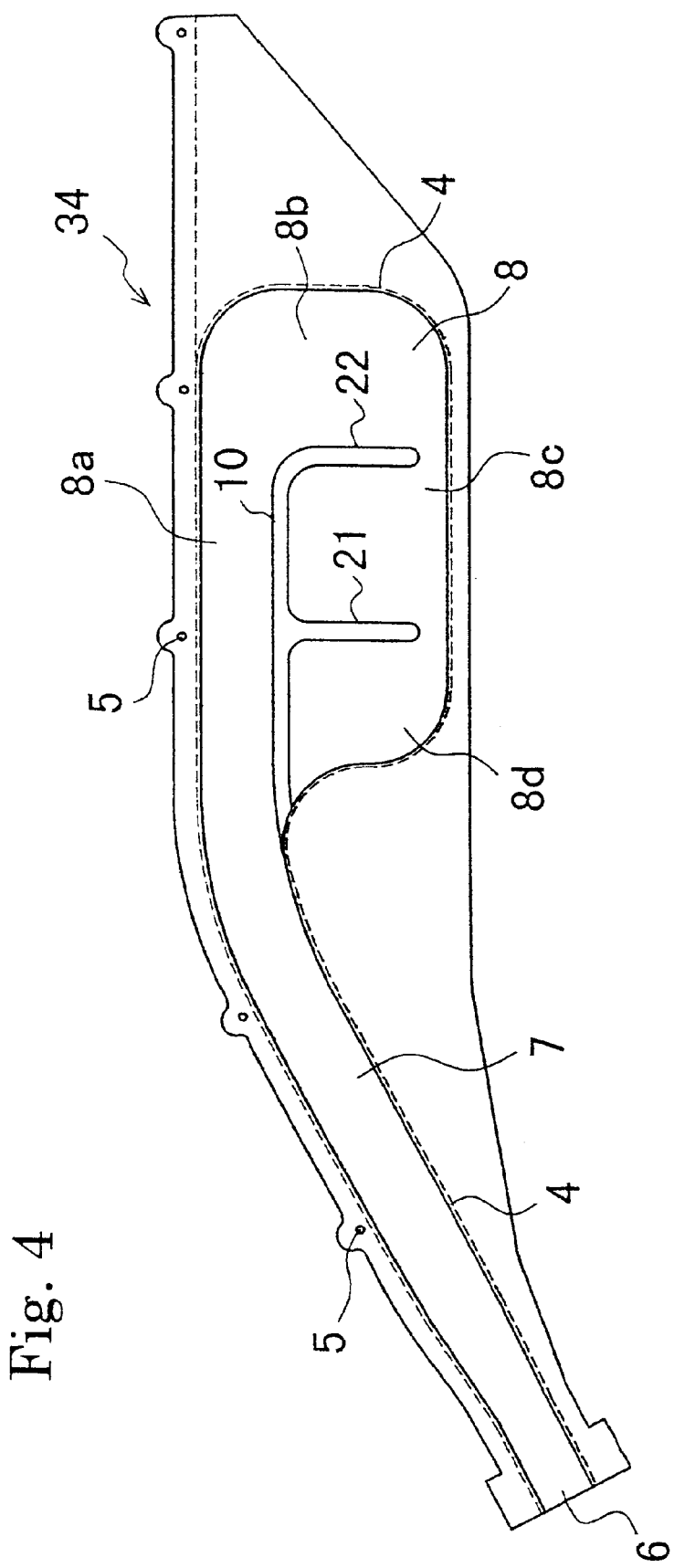
FIG. 4 is a structural view of a protective bag for a vehicle occupant's head according to a fourth embodiment.
Figure 5:
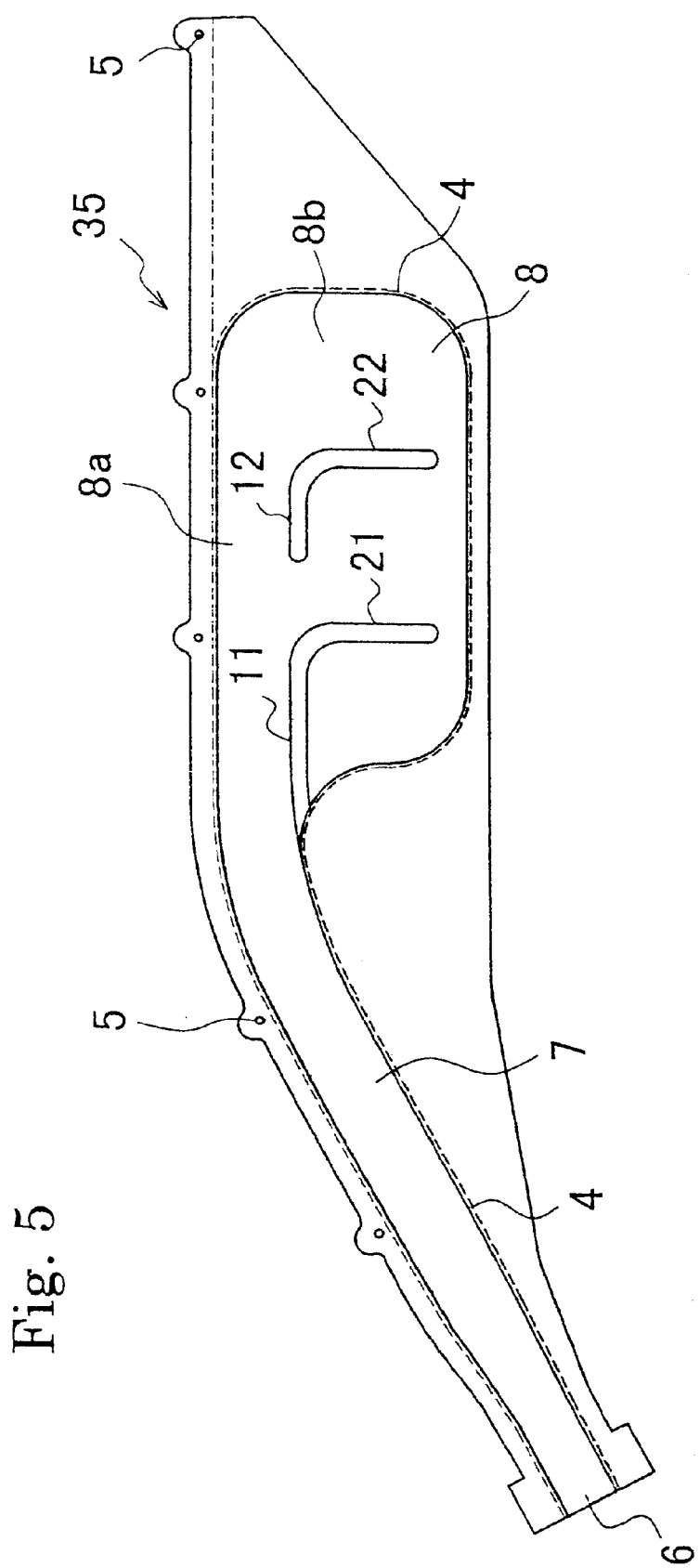
FIG. 5 is a structural view of a protective bag for a vehicle occupant's head according to a fifth embodiment.
Figure 6:
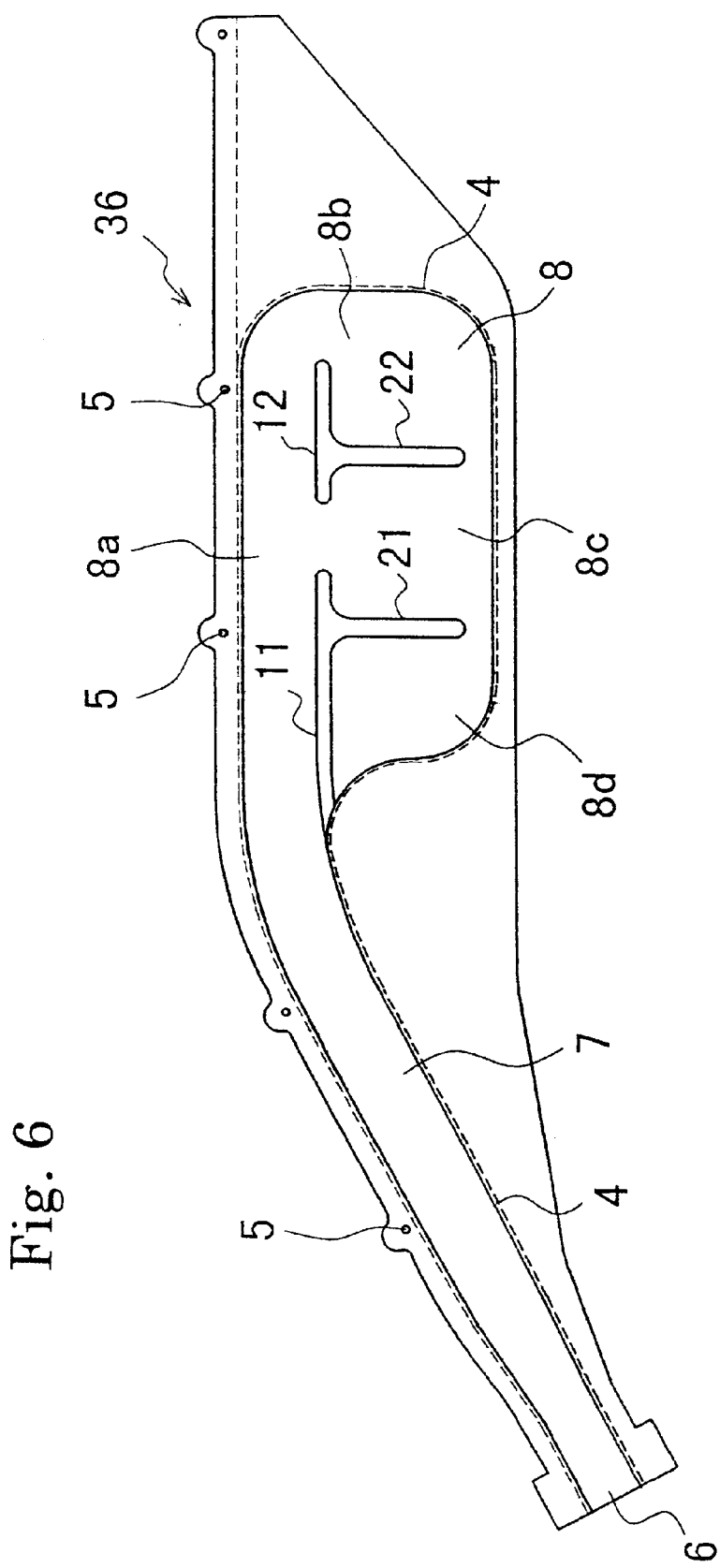
FIG. 6 is a structural view of a protective bag for a vehicle occupant's head according to a sixth embodiment.

Though the vertical lines 21, 22 extend obliquely so that their lower ends become nearer the rear of the vehicle in FIGS. 1a through 3, the lines 21, 22 may extend almost vertically as shown in FIGS. 4 through 6 where bags 34, 35, 36 have substantially vertical lines.

Figure 7:
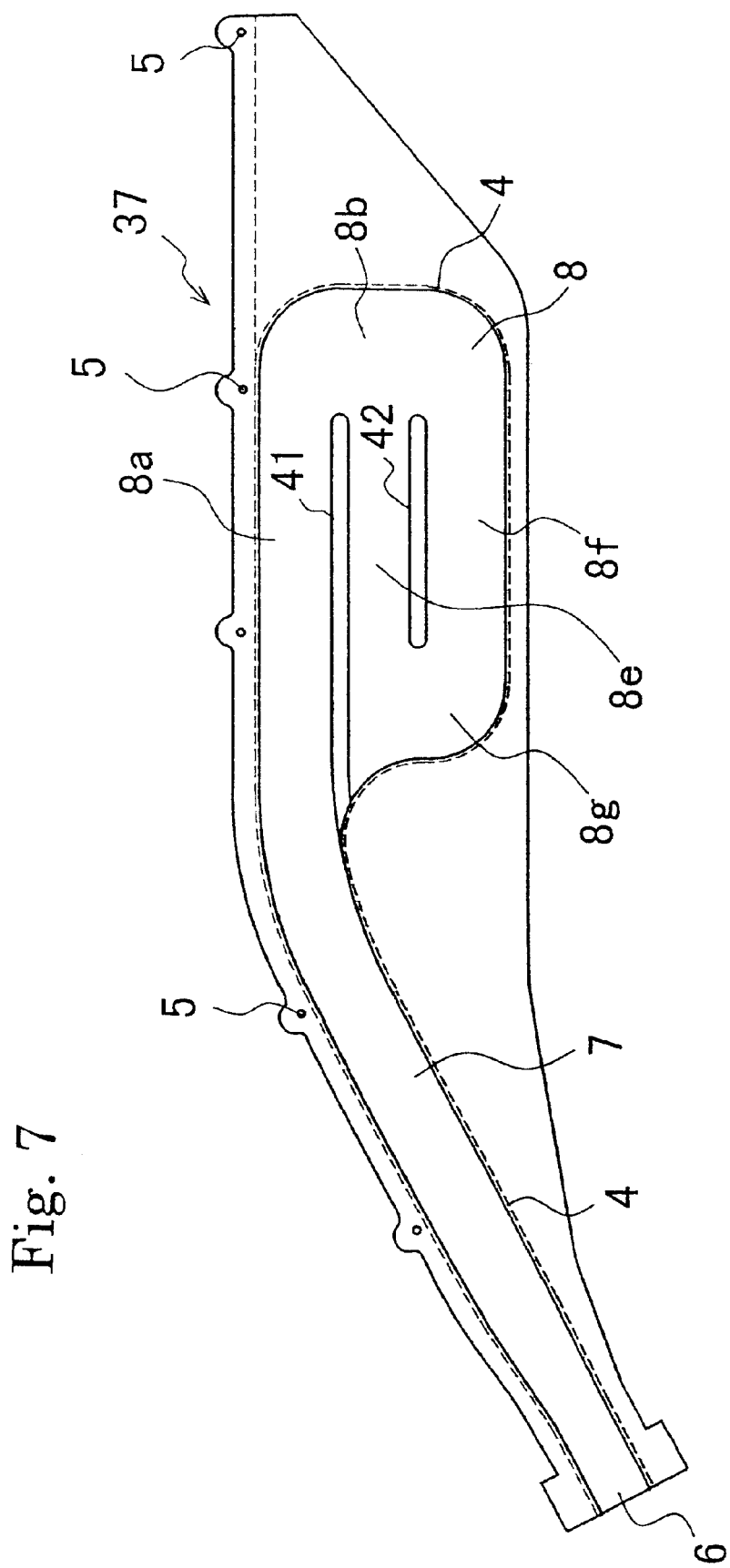
FIG. 7 is a structural view of a protective bag for a vehicle occupant's head according to a seventh embodiment.

FIG. 7 is a front view of a bag 37 according to still another embodiment. The bag 37 has only two lateral connecting lines 41, 42. The upper lateral line 41 is connected to the lower edge of the introduction chamber 7 on the front side of the main chamber 8 and extends rearwardly therefrom in the substantially horizontal direction and is spaced apart from the rear side of the main chamber 8.

The lower lateral line 42 extends in substantially parallel with the upper lateral line 41.

The front and rear ends of the lower connecting line 42 are spaced apart from the front side and the rear side of the main chamber 8, respectively.

When gas is introduced from the inflator into the gas inlet 6 of the bag 37, the gas flows from the cell 8a above the line 41 to the cell 8b. Then, the gas flows to a cell 8e between the lateral lines 41 and 42 and a cell 8f under the line 42 at the same time and then flows to a cell 8g in front of the line 42.

The bag 37 can also be rapidly inflated as well as the respective bags 1, 32 through 36.

Though the introduction chamber 7 is arranged along the A pillar and the main chamber 8 is arranged on a lateral side of a front seat in the above embodiments, the introduction chamber 7 may be arranged along a C pillar and the main chamber 8 may be arranged on a lateral side of a rear seat.

The main chamber 8 may be elongated to cover the lateral side of the front seat and the lateral side of the rear seat. In this case, the introduction chamber 7 may be arranged along either the A pillar or the C pillar.

As described above, the protective bag for a vehicle occupant's head of the present invention can be inflated quickly as a whole, compared with a conventional one. Therefore, an inflator with small capacity can be employed.

What is claimed is:

1. A protective bag for a vehicle occupant's head, comprising:

a sheet formed of an occupant side and a vehicle body side and joined together for forming an elongated space therein extending in a longitudinal direction of a vehicle, said space having a gas inlet formed at one end in the longitudinal direction, an introduction chamber communicating with the gas inlet and extending along the longitudinal direction therefrom, and a main chamber communicating with the introduction chamber and having a front side, a rear side, a bottom side and an upper side, a lateral connecting line situated in the main chamber and formed by joining the occupant side and vehicle body side together, said lateral connecting line being directly connected to the front side to extend toward the rear side to form an upper cell between the upper side and the lateral connecting line to thereby introduce a gas from the gas inlet directly toward the rear side through the upper cell, and a first vertical connecting line situated in the main chamber and formed by joining the occupant side and vehicle side, said first vertical connecting line extending downwardly directly from the lateral connecting line to the bottom side to thereby form a rear cell between the rear side and the first vertical connecting line.

2. A protective bag according to claim 1, wherein said first vertical connecting line has a space relative to the bottom side to allow the gas in the rear cell to flow therethrough.

3. A protective bag according to claim 2, wherein said lateral connecting line extends toward the rear side more than a half between the front and rear sides.

4. A protective bag according to claim 3, further comprising a second vertical connecting line extending downwardly from the lateral connecting line between the first vertical connecting line and the front side to have a space relative to the bottom side.

5. A protective bag according to claim 4, wherein said lateral connecting line is one continuous line without interruption.

6. A protective bag according to claim 4, wherein said lateral connecting line is formed of two lines having a space in a middle thereof, said first and second vertical lines being respectively connected to the two lines for forming the lateral connecting line.

7. A protective bag according to claim 6, wherein said first and second vertical lines are respectively connected to middle areas of the two lines.

8. A protective bag according to claim 1, wherein said sheet is formed of an occupant-side sheet and a vehicle body-side sheet superposed on each other and joined together along peripheries thereof, said lateral and vertical connecting lines are made by sewing, adhesion or welding.

9. A protective bag according to claim 1, further comprising through holes formed at an upper portion of the bag for inserting fixtures for mounting the bag.

* * * * *